INVENTOR
SAMUEL ROY CAPLAN
BY *Larson and Taylor*
ATTORNEY

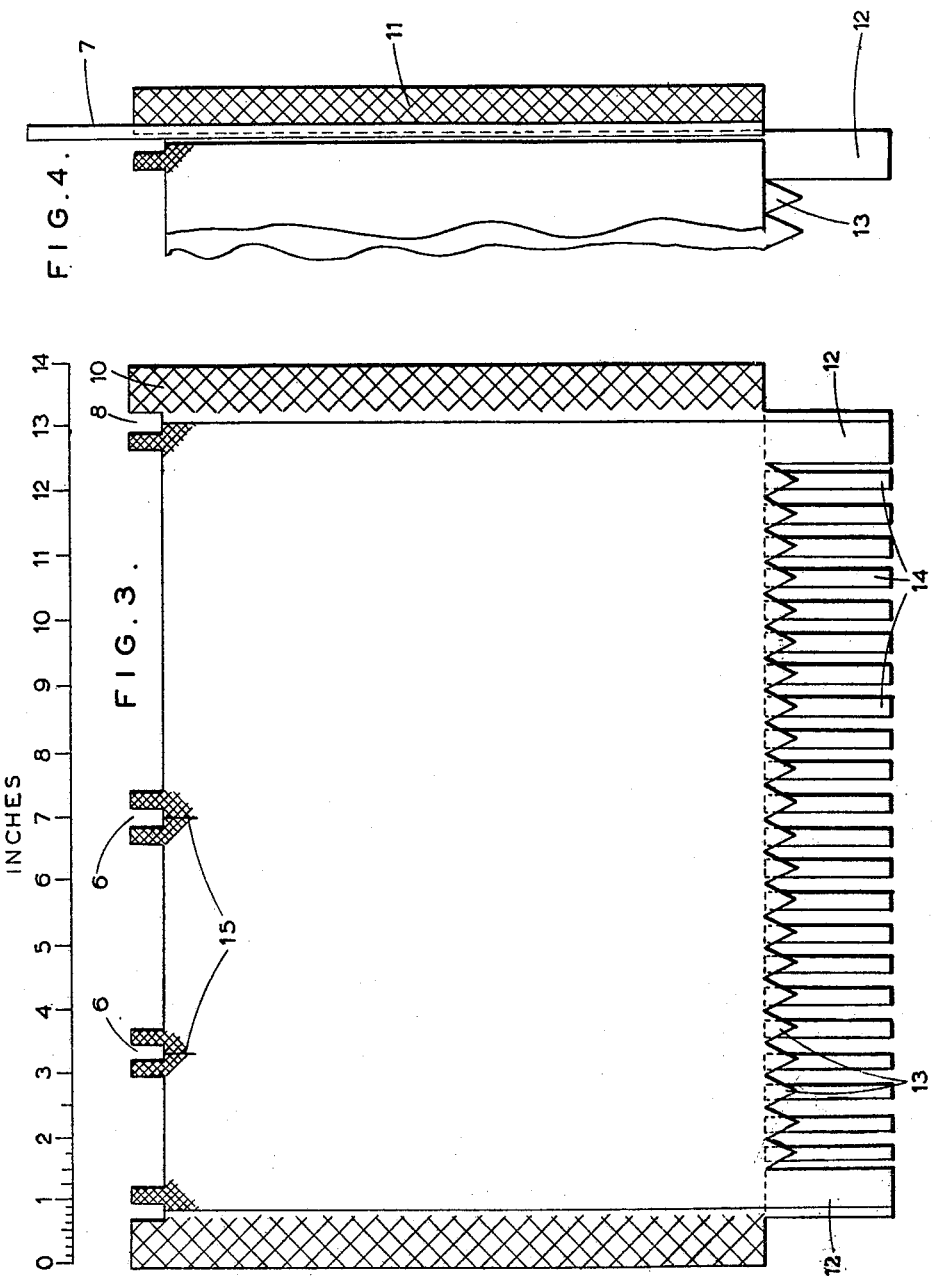

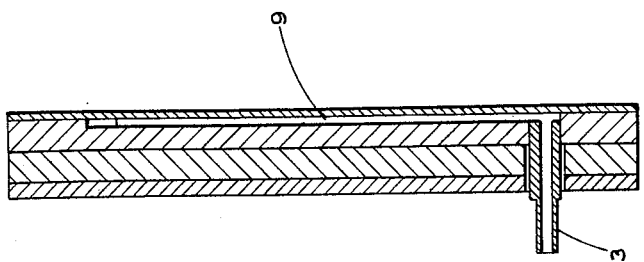
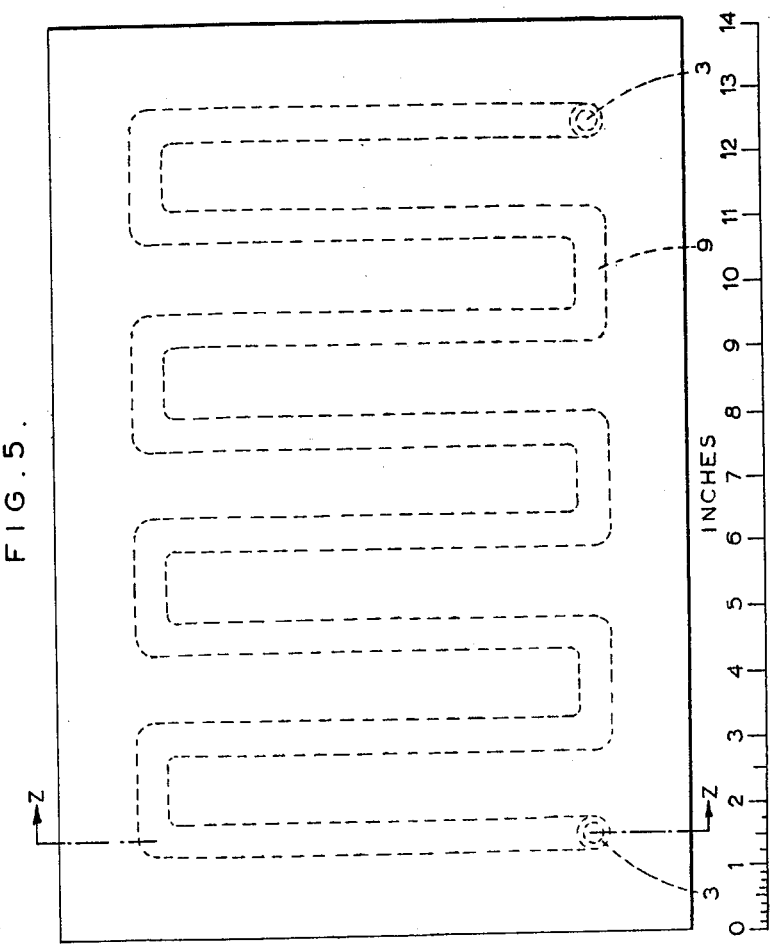

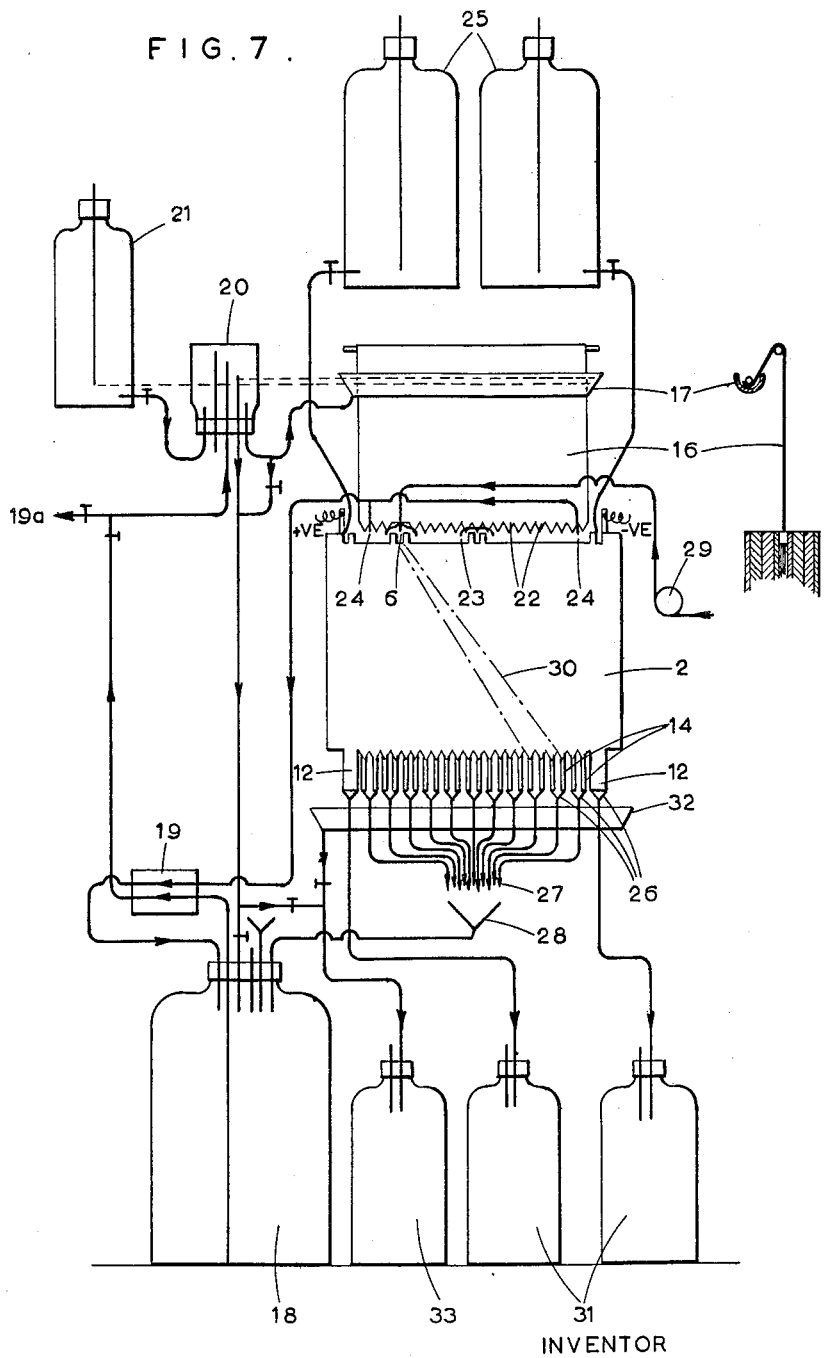

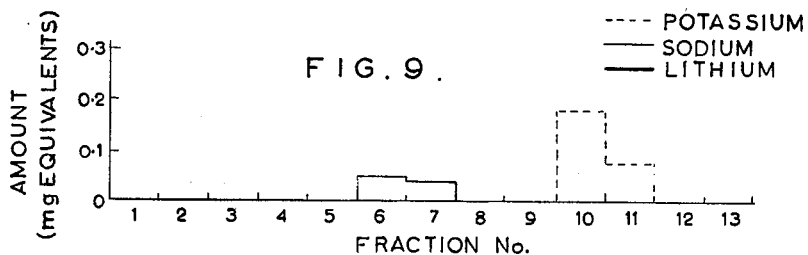
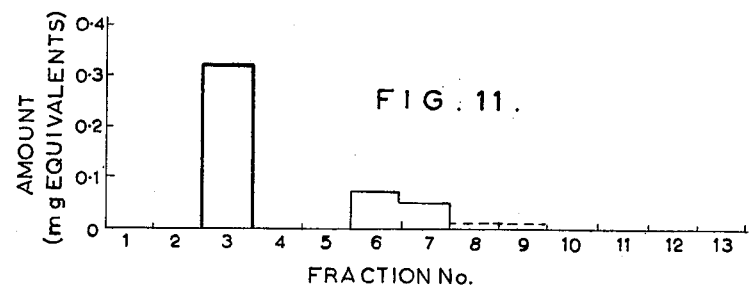
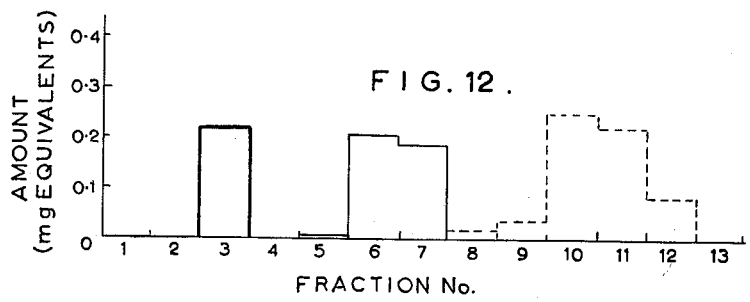
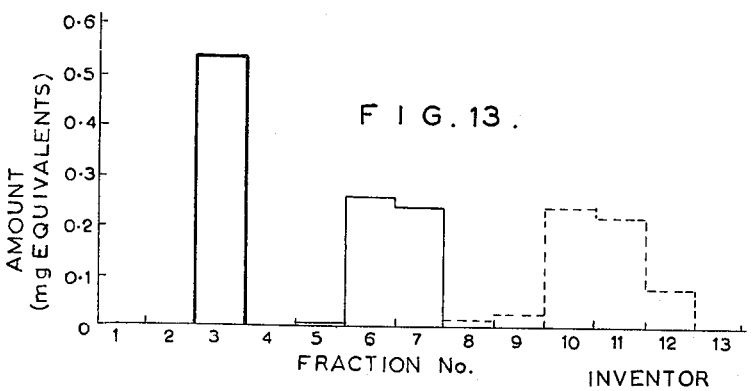

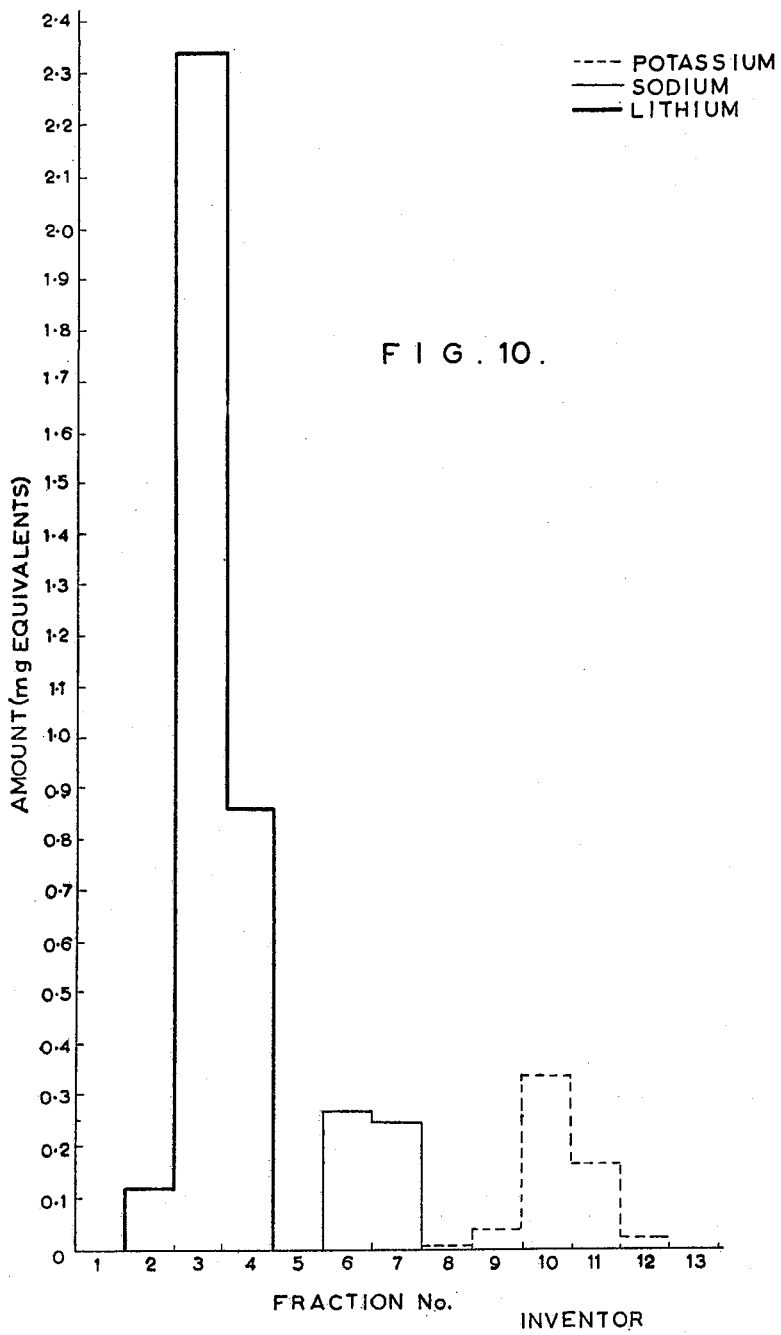

United States Patent Office 3,085,956
Patented Apr. 16, 1963

3,085,956
PROCESS AND APPARATUS FOR EFFECTING ELECTROCHROMATOGRAPHIC SEPARATIONS
Samuel Roy Caplan, Wimbledon, London, England, assignor to National Research Development Corporation, London, England, a British corporation
Filed Dec. 2, 1959, Ser. No. 856,737
Claims priority, application Great Britain Dec. 3, 1958
8 Claims. (Cl. 204—180)

This invention relates to an improved process and apparatus for effecting electrochromatographic separations.

Both electrophoresis (or electromigration) and chromatography have long been employed for the resolution of mixtures of solutes. Furthermore the two techniques have also been combined in a special cell, with flow of electric current at an angle, usually right angles, to the flow of solvent to effect a resolution of solutes by electrical migration combined with chromatographic adsorption.

Continuous electrochromatography (sometimes called "continuous electrophoresis" or "curtain electrophoresis") has in recent years become a standard technique for the continuous separation of mixtures of solutes. In principle, resolution is obtained by electrical migration transversely to the flow of a suitable eluant in a stabilising ("anti-convection") medium. This medium almost invariably consists of vertical sheets or pads of filter paper, and the feed mixture is introduced at a convenient point along the top. The function of the medium is primarily to ensure a uniform flow of the eluant; this is most easily achieved with filter paper. However, it has been supposed that a secondary function is to provide a stationary phase so that partition can take place as in normal chromatography. In the entire absence of sorption by the stabilising medium, separation will clearly depend only on the relative electrophoretic mobilities (within the medium) of the solute zones. If sorption occurs, on the other hand, separation will depend not only on the relative mobilities of the zones but also on their relative break-through volumes. This factor can act either as a help or as a hindrance—in other words the chromatographic effect can either reinforce or oppose the electrophoretic effect in resolving the mixture. The two effects nullify one another when the relative velocities of the various species in both component directions coincide, since the particles then follow the identical path, although in general at different speeds. They reinforce each other when the order in which the species travel in one direction is the reverse of that in the other. This is the most favourable situation.

The electrophoretic properties of the system are, however, not independent of the chromatographic properties. In fact the resolution obtained by electrophoresis alone in a medium ("zone electrophoresis") is itself a function of sorption. Suppose that adsorption of the solutes takes place on the stabilising medium, and that the term "mobility" in relation to the solute particles refers only to their rate of electrical migration in the free eluant solution. Clearly, then, the overall electrophoretic velocity must depend both on the mobilities and on the adsorption isotherms. It follows that the degree of separation obtainable in carrying out continuous electrochromatography is independent of the adsorption in the case of the stablising media hitherto used, and depends only on the relative mobilities. The point can be appreciated by realising that while both the vertical and the horizontal migration rates of the particles bear an inverse relationship to their adsorbability, the horizontal migration rate is also governed directly by the mobility. In calculating the direction of the resultant, adsorption cancels out. The adsorbents used up to the present cannot modify the degree of separation in any way; the case of the chromatographic and electrophoretic effects nullifying one another is simply the case of solutes having the same mobility. Moreover, reinforcement of the two effects does not truly take place, for the same reason. A true reinforcement could only be achieved if the immobilising effect of adsorption could be limited to the direction of eluant flow.

In order to improve matters where mobility differences are small, complexones have been introduced into the eluant solution. Insofar as these alter the distribution of a given species between mobile and stationary phases they have no effect; their action is purely to alter and possibly even reverse the direction of the effective mobilities. The electrophoretic migration of a species under these conditions is determined by its affinity for the complexone and by the mobilities of both the complexed and uncomplexed particles. Striking separations have been accomplished by these means, but the optimum conditions described above are still not realised.

From the point of view of electrical conductivity, wet ion-exchange resins, although solid in the gross physical sense, act as solutions of electrolytes. The current is carried by the adsorbed ions. Ion-exchange resins can be used as a supporting medium for electrophoretic separations. The ionic mobilities within the resins are of course subject to a series of modifying influences but however great the affinity of an ion for a resin it is never rendered electrically immobile within the resin phase.

The most favourable conditions for continuous electrochromatography call for a stationary phase within which particles are immobilised with respect to eluant flow but not with respect to current flow. If a means could be found whereby ion-exchange resins could be used in continuous electrochromatography, an approximation to the ideal conditions could be achieved, especially since it is generally true that the order of increasing affinity for an ion-exchange resin corresponds to the order of increasing mobility.

It is accordingly an object of the present invention to provide a cell and a process for use in effecting electrochromatographic separations.

The problem is to find a suitable physical arrangement whereby a path free of obstacles is created for electromigration in the resin phase. In other words, it is required to keep the volume of eluant per gram of resin as low as possible. Such an arrangement is not immediately obvious. Two possibilities for using resins in granular form suggest themselves, but neither appears to be very satisfactory. One is to pack resin beads into a deep box with electrodes down the sides, which is the method which has been used for glass powder. To ensure uniform flow in a packed box complex arrangements involving multiple pumping are necessary. The other is to substitute resin-impregnated filter paper for ordinary filter paper in a conventional apparatus. This has the advantage over the first suggestion of ease in obtaining uniform flow but the eluant volumes per gram of resin would necessarily be higher. Although both schemes are possible and may have some applicability, it is apparent that in either scheme the pattern of electrophoretic migration within the resin can be seriously distorted by relatively large intervening regions of eluant phase, particularly when complexones are used. In the absence of complexones this may be less of a drawback and the effect could certainly be minimised by very close packing of fine resin particles, but close packing leads to added flow difficulties on the gross scale, and is not easily achieved when using impregnated papers.

The present invention envisages the use of ion-exchange resins in membrane form, as offering a much more satisfactory alternative to the use of such resins in granular form.

Furthermore, this invention envisages the use of such membranes in such a way that, in contrast to the manner in which ion-permselective membranes have hitherto been used, the transport of ions takes place through the breadth or width of the membranes rather than through their thickness and the electrical potential gradient is arranged to lie in a plane parallel to that containing the same membranes.

It remains for the present invention to provide some means for ensuring the uniform flow of the eluant past the membrane surface.

Accordingly, this invention provides a cell for use in effecting electrochromatographic resolution or relative concentration of at least one of plurality of solutes which comprises a pack of alternating sheets of ion-exchange material and sheets of another anti-convectant material held in face-to-face physical contact, means for introducing a solution containing a plurality of solutes into said pack at a point along an edge thereof to form a chromatographic column, means for introducing an eluant into said pack along the remainder of said edge and for traversing said eluant through said pack, means for applying an electric potential across said pack in a plane parallel to said membrane but transversely to the direction of traverse of said eluant, and means for collecting at least two fractions of the resulting eluate at different points on the opposite edge of said pack. Most advantageously, the sheets of ion-exchange material are ion-exchange membranes rather than, for example, resin-impregnated paper or like sheets.

This invention also provides a process for effecting the electrochromatographic resolution or relative concentration of at least one of a plurality of solutes which comprises introducing a solution containing a plurality of solutes into a cell as defined above at a point along the edge thereof to form a chromatographic column, introducing an eluant into said cell along the remainder of said edge and traversing it through said cell transversely to and whilst employing said electric potential and collecting at least two fractions of the resulting eluate at different points on the opposite edge of said cell.

Advantageously the process is carried out continuously by introducing both said solution and said eluant continuously.

In the simplest case the membranes and sheets will in substance be rectangular, the eluant will be supplied to a point on the upper edge of the pack and be allowed to flow therethrough under the force of gravity to its bottom edge, and the electric potential gradient will be arranged to extend from one vertical edge of the pack to the other. Whilst the invention is by no means limited in these respects, reference will hereinafter be made for the sake of simplicity of description to the supply of eluant to the upper edge of the pack, the withdrawal of fractions of eluate from the lower edge of the pack, and the application of a potential gradient between the side edges of the pack.

In the present invention the anti-convectant and flow-stabilising medium may, for example, comprise sheets of filter paper, glass fibre paper or other similar materials. The ion-exchange membranes are preferably homogeneous membranes of low specific resistance, but the use of homogeneous and heterogeneous membranes of every conceivable type—both cationic and anionic—is within the invention; indeed, the use of interleaved packs consisting of alternate cationic and anionic membranes is not ruled out. The ion-exchange material employed in any given case must, of course, be so selected that it has at least a slight preferential selectivity for one of the ion species present in the solution of solutes to be fed to the cell; preferably the resin is one of high selectivity so that the most strikingly improved separations are obtained.

Whether a particular membrane will give a satisfactory separation in the case of certain given ionic species may be evaluated by ascertaining a "separation coefficient" $D_2^1$ as the ratio $\tan \theta_1/\tan \theta_2$ where $\theta$ is the angle through which the path of a given species is swept from the vertical under the influence of an applied potential. The coefficient $D_2^1$ can be evaluated most simply by carrying out separate electrophoretic and chromatographic separations on strips of paper or paper-membrane-paper sandwich. Such strips are readily examined spectrophotometrically or radiometrically, and it is only necessary to divide the ratio $x_1/x_2$ of distances moved in an electrophoretic run by the corresponding ratio for a chromatographic run carried out under the same conditions. It is easy to see that, providing the individual ratios are obtained from single runs involving both species, the value of $D_2^1$ is independent of voltage or rate of flow of eluant.

The packs of membranes and sheets on which the cells in accordance with the invention are based will normally be supported in a press with cooled platens to maintain the electrolyte within the cell at a suitable even temperature and, if and when necessary, the packs may be divided up by additional narrow cooling compartments.

One advantage of the use of the invention arises from the fact that it is possible to prepare ion-exchange materials in membrane form which exhibit a high degree of selectivity in relation to a series of ions of like sign.

Another advantage arises from the fact that a particularly favourable working arrangement is obtained from the use of an ion-exchange resin phase when it is combined with the use of an eluant which contains a complexone.

The advantage of using complexones lies in the fact that when a set of closely related cations, such as the rare earths, are examined those which are most strongly complexed have the lowest affinity for the resin, and vice versa. With suitable choice of resin, ligand and pH, the complex ions (or uncharged particles) are excluded from the resin phase, while the concentration of free metal ions in the eluant is negligibly small. Thus the substances undergoing separation are essentially distributed between complexone and resin, with much greater differences in their respective distributions than in the case of a non-complexing eluant. The degree of separation obtainable depends on these distributions. It can be shown, also, that if the relative affinities for the resin are similar, the separation is governed entirely by the stability constants of the complexes provided the mobilities within the resin phase are also similar. In a word, the use of a complexone magnifies the selectivity of a resin, and enables separations to be accomplished on exchangers of otherwise comparatively low selectivity.

A continuous electrochromatographic cell incorporating a stationary phase of ion-exchange resin benefits from operating conditions determined by a consideration of selectivities as set out above. This is precisely because the chromatographic effect reinforces the electrophoretic effect, and anything which augments the former improves the separation as a whole. For example, suppose that as a result of using a resin of higher selectivity the distribution of a particular species is altered in favour of the stationary phase. A calculable decrease in its migration rate relative to other species in the direction of eluant flow takes place, but nothing approaching this decrease occurs in the direction of current flow (unless the specific conductance of the resin is very low). In fact, in the presence of a complexone, an increase in the relative rate of electromigration is possible. Assuming that exchange equilibrium is reached very quickly, and that the complexed body is large, of relatively low mobility and oppositely charged (the latter need not necessarily be the case), then the net electro-migration of the zone will be given by the algebraic sum of the fluxes in the two phases, taking into account their relative cross-sectional areas. Moreover, in these circumstances a "counter-current" effect is established in the direction of electromigration. Since the weight of the ligand is, in general, much greater than that of the complexed ion it is reasonable to suppose that complexes of two isotopes would have nearly identical mobilities. A further example is that of two ions so similar that the difference in their distributions, even between complexone and resin, is very small. Then since reinforcement takes place and the slower-running ion in the vertical direction is the faster-running in the horizontal, a much greater degree of separation is obtainable by continuous operation than would be the case in either batch-wise chromatograph or batch-wise electrophoresis.

An additional advantage arising from the present invention is that, as compared with conventional chromatographic or electrophoretic techniques (whether or not ion-exchange media are used), a continuous rather than a batch separation is obtained with an apparatus requiring very little attention. Continuous operation, in general, is superior for preparative work on a large scale if the plant operates to a large extent automatically.

Furthermore, as compared with conventional counter-current procedures, including electrodialytic ones using ion-exchange granules or membranes, and conventional electrodialysis with or without ion-exchange membranes, a continuous and complete or relatively complete separation of three or more species, rather than a maximum of two, can be achieved in a single pass.

The use of ion-exchange resins increases the "retention time" of many substances within the cell and in the simplest mode of operation this in itself can lead to improved separations, provided the electrophoretic mobility is not decreased in the same proportion.

It is further to be noted that the present invention takes advantage of useful properties of ion-exchange resin membranes whilst avoiding certain disadvantageous properties thereof; thus, the membranes need only satisfy less stringent requirements in regard to the absence of flaws, holes, and so forth, than they must satisfy when used for electrodialysis. Furthermore, the membranes are less subject to objectionable physical breakdown when arranged as alternate layers in packs than when used for ordinary electrodialytic purposes. It is also to be noted that the interleaved membrane packs are more robust than packs of paper alone.

The most important of the problems to be overcome in carrying out continuous electrochromatography on interleaved membrane packs in accordance with the invention are:

(a) The prevention of leakage at the edges of the pack, and (b) The choice of electrodes and the removal of the products of electrolysis.

The membranes and paper separators may be waxed at the outer edges. Both uniform electrical fields (with electrodes running down the sides of the pack) and non-uniform fields (with the corners of the pack shaped to dip into separate electrode vessels) are feasible. In the former case, the electrodes may be placed in direct contact with the pack or in tubular sleeves of ion-permeable material through which convenient electrolytes are circulated. The electrodes themselves may be inert, reversible, or attackable. To avoid unnecessary wastage of ion-exchange material the membranes may, for a specific purpose, be cut in a triangular shape with the apex at the feed-point and the base-angles determined by the paths of the most widely diverging components of the mixture. The paper separators may be similarly shaped if it is desired to increase the field intensity in the region of the feed-point. The pack may be operated under either constant voltage or constant current conditions, and in certain circumstances pulsed high-voltage D.C. supplies may be economically advantageous.

Various possibilities are available for the treatment of the products obtained in the eluate fractions, it being understood that those portions of the eluate not containing components of the feed mixture may be directly recycled as eluant. Two will be discussed. Firstly, if a higher degree of purification or enrichment is desired than can be achieved in a single pass, cells in accordance with the invention may be used in cascade. Secondly, concentration of the products may be effected, in certain cases, by collection of the relevant fractions directly in conventional ion-exchange columns. For example, in the separations described below (potassium, sodium and lithium, using uramil-N,N-diacetic acid as complexone at pH 9.5) the products might be concentrated on cation exchange columns. This would require continuous adjustment of the pH of the eluate fractions, prior to their entering the columns, to a suitably low value such that the desired cations would be freed from their ligands while competition for the resin sites from hydrogen ions remained negligible.

Discontinuous operation of inter-leaved membrane packs in accordance with the invention is not ruled out, and may have advantages, in particular for analytical purposes. Moreover separations are not restricted to ions of like sign; interleaved packs will equally well separate ions of opposite sign.

The process and apparatus of this invention are thought to be of particular value in separating or purifying the following, among other, classes of materials:

(a) Alkali metals, alkaline earth metals, rare earths, actinides, and certain other heavy metals, (b) Isotopes, and (c) Proteins, peptides and amino-acids.

So that the invention may be the better understood, the following description of a specific embodiment of apparatus in accordance therewith and of the application of the apparatus to the separation of potassium, sodium and lithium ions is given by way of example and with reference to the accompanying drawings, in which:

FIGURE 3 is a section on the line X—X in FIGURE 2;

FIGURE 4 is a section on the line Y—Y in FIGURE 2;

FIGURE 5 is an elevation of the cooling platen of the press on FIGURE 1;

FIGURE 6 is a section on the line Z—Z in FIGURE 5;

FIGURE 7 is a flow sheet illustrating the best mode of use of the cell for effecting continuous electrochromatographic separations in accordance with the process of the invention; and FIGURES 8 to 13 are block graphs illustrating the results obtainable by the said process as discussed below.

Figure 1:
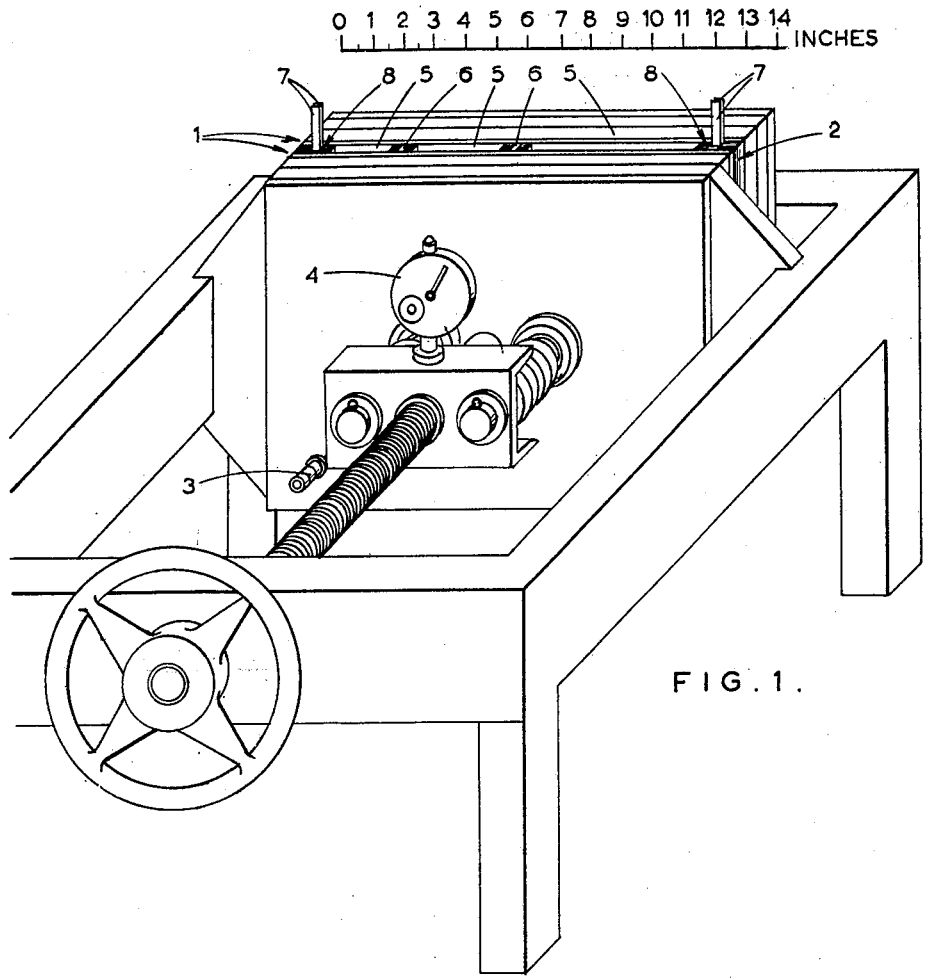
FIGURE 1 is an isometric view of a press containing a cell in accordance with the invention.
Figure 2:
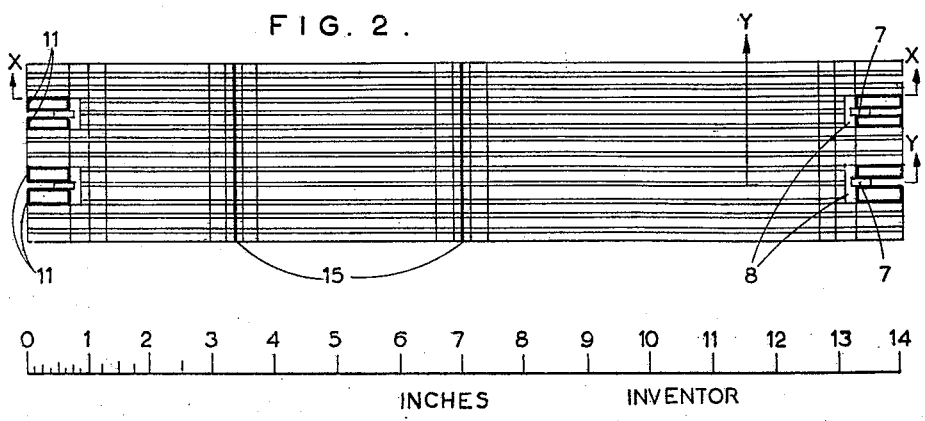
FIGURE 2 is a plan view of the cell in the press of FIGURE 1.

FIGURE 1 shows the pack 2 (a small one containing only a dozen membranes) constituting the cell mounted in a simple press capable of giving a uniform pressure up to 5 lbs./in.$^2$, the pressure being registered on the gauge 4. The platens 1 of the press (14" x 10") are, as shown in more detail in FIGURES 5 and 6, each constructed of two ½" thick plates of polymethacrylate backed by a ³⁄₁₆" steel plate, and shallow grooves 9 cut into the side opposite the steel plate are covered by a final ⅛" sheet of polymethacrylate which forms the inside face. The grooves conduct cooling water supplied through connectors 3, the two platens being operated in counter-current.

At the top of the pack is an eluant trough or recess 5 and a pair of alternative feed-points 6. At each side of the pack are pairs of platinum ribbon electrodes 7, with each pair of which is associated an electrolyte channel 8.

Although in this case the pack is only about ⁵⁄₃₂"

thick, there is no reason in principle why it would not be very much thicker providing suitable arrangements are made for distributing eluant, collecting eluate and inserting sufficient electrodes. Indeed, the press described and illustrated is capable of accepting 6" thick packs. Narrow cooling compartments made of a suitable non-conducting material would almost certainly have to be introduced at intervals in thick packs, but these should not lead to any difficulties. The membranes (0.004" thick) are homogeneous sulphonated polyvinyl chloride sheets prepared in accordance with Patent No. 2,948,637.

The membranes and separating papers are cut, waxed and assembled as illustrated in FIGURES 3, 4 and 5. Two coats of a saturated solution of paraffin wax (M.P. 54°–58° C.) in carbon tetrachloride are applied, as shown by cross-hatching in FIGURES 3 and 4, to each side at the edges 10 and points 6 at which electrolyte or feed respectively are introduced. The feed may be introduced centrally or in the vicinity of an electrode, which may be either anode or cathode. Two anodes and two cathodes 7 are used in this pack, consisting of 12" lengths of bright platinum ribbon (¼" x 0.001"). Each ribbon is arranged with one edge projecting slightly into a vertical channel 8 down which anolyte or catholyte can flow from the reservoirs above. The ribbons are each supported between two thick lengths of waxed filter paper 11 (Whatman No. 3MM, thickness 0.011") which form one side of the channel. The other side of the channel consists of the edges of certain of the membranes and papers cut to a reduced width as compared with the remainder. The interleaving papers (0.007" thick) are cut from sheets of "Separa DHC." This is a special type of double acid-washed hardened paper of high wet strength and very low mineral content; it is very fast flowing and has a slightly creped surface. The direction of the crepe is made vertical in the pack in order to facilitate parallel flow. Wide tabs 12 at each lower corner help to lead off anolyte and catholyte solutions. Between these a series of twenty-two ½" wide toothed serrations 13 define the total number of fractions which can be collected.

After the pack has been assembled each serration is interleaved with about six ¼" x 2" strips 14 of Whatman No. 3MM paper; these are the eluate lead-off strips and their final numbers are adjusted to give as uniform a flow as possible. The whole pack is assembled wet between two sheets of polyvinyl chloride plastic material (not shown) and inserted into the press; the latter is placed for this purpose with its platens horizontal. The waxed feed-points 6 are then slit and 3MM paper forced into the slits to act as wicks 15; this results in a sharply defined entry. The press is closed and stood upright with the plastic material protruding to the extent of about 1" at the sides and top, but not below. The slot-shaped eluant recesses 5 are filled with water, and the press tightened to maximum pressure and slackened off again several times to expel all traces of air. Finally the pressure is adjusted to 2½ lbs./in.²

The most convenient way of distributing eluant evenly to all parts of the eluant recesses 5 is, in this case (see FIG. 7), by means of a "curtain" 16 of Whatman No. 1 filter paper dipping at the upper end into a constant-level feed trough 17 filled from a reservoir 18 below by means of a "sigmamotor" pump 19 (priming point 19a), and constant level device 20. If the level in the trough 17 falls by more than a small amount (for example, as a result of pump failure), then an auxiliary gravity-feed reservoir 21 continues to supply eluant for a short while.

The curtain 16 is covered on either side with polyvinyl chloride plastic material (not shown) to prevent evaporation, and is serrated at the bottom in the same way as the interleaving papers. The tips of the serrations 22 are suspended above the recesses 5 in the top of the pack 2 and allowed to adhere to one of the protruding plastic sheets along the top of the pack. The tooth vertically above the feed-point 6 chosen for the run is folded back. The three sections of the recess are interconnected by means of polyethylene cannula syphons 23, the level of eluant in the recess being determined by two glass suction capillaries 24 driven by pump 19 which prevent it from over-flowing into the feed-point or electrolyte inlets. Electrolyte is gravity-fed from two large Mariotte bottles 25.

Below the lead-off strips 14 a fraction-collector is placed consisting of a rack of thirteen funnels 26. The two large end tabs 12 are each given a funnel to themselves, draining to electrolyte collectors 31, while the strips between them are taken in pairs to the remaining eleven. (If desired, twenty-four funnels can be used.) It is essential for proper flow for the strips 14 to adhere to the sides of the funnels. From the funnels the eluate runs to a series of collecting bottles (arranged at the point 27, FIGURE 7), or the outlets can be arranged over a large funnel 28 leading back to the main eluant reservoir 18 if recirculation is desired.

Beneath the pack 2 and fraction collector funnels 26 is disposed a polyethylene waste solution trough 32 draining to waste solution bottle 33.

Before commencing a run the pack 2 is cycled to the desired form precisely as if it were an ion-exchange column. It is then equilibrated under recirculation for at least sixteen hours with the eluant. At the end of this period flow of anolyte and catholyte is started, and the D.C. power-pack is switched on, operating under constant current conditions. The flow of cooling water through the platens is 7 gals./hr.; in the following examples no appreciable rise in its temperature took place. After a short period to allow the pack to settle down, the micro pump 29 for feeding the solution to be resolved to feed-point 6 is turned on.

EXAMPLES

In the examples the runs were continued for twenty-four hours after the commencement of feeding. The feed-point was near the anode (as shown in FIGURE 7), and in each case 75 ml. of feed were pumped in at a rate of 5.6 ml./hr., that is feeding was carried on for the first 13½ hours and then stopped. The fractions collected were numbered 1 to 13, starting with the anolyte and ending with the catholyte, the feed-point being directly above fraction 3, and a typical ionic path through the pack being indicated by broken lines at 30.

In general the rate of flow of eluate, per fraction, for fractions 2 to 12 is 20 ml./hr., so that about 5 litres of eluant are needed for a full run. A rather high flow-rate, over 100 ml./hr., was required for the anolyte and catholyte. To obtain this it was necessary to seal the tubing from the Mariotte bottles 25 into the electrolyte inlets 8 with wax.

The separation of the alkali metals potassium, sodium and lithium might well be carried out in an interleaved pack of cation-exchange membranes in the hydrogen form, using a simple eluant of suitably dilute hydrochloric acid. However, the difficulties of this method are considerable, since in order to prevent the wattage dissipated becoming too high the acid concentration must be kept low. Under these conditions the retention volumes of the ions are very large, and to maintain a reasonable throughput a very high eluant flow-rate indeed would be needed.

The method of the two examples here described is based on the use of the complexone uramil-N,N-diacetic acid (see G. Schwarzenbach, E. Kampitsch and R. Steiner, Helv. Chim. Acta, 29, 364 (1946)). The pack was first conditioned to the dimethylamine form, using an 0.5% solution of dimethylamine in water. Uramil-N,N-diacetic acid (obtained from Hopkin & Williams Ltd.) was prepared for use by dissolving in water at 60° C. and passing the solution (containnig about 5% UDA) through a column of Amberlite IR–112 resin, also at 60° C., to free it from sodium and other impurities ("Amberlite" is a registered trade mark). The eluate was evaporated to dryness and the product dried for 1 hour at 80° C. During this treatment a certain amount of murexide was formed by oxidation, and the resulting solutions were always coloured, but this proved a help rather than a hindrance as changes in pH could rapidly be recognised. The analyses were carried out by means of a modified "BEI" flame photometer calibrated for the purpose. A high degree of accuracy was neither aimed for nor achieved, the prime object being rapid location of the zones. The electrolytes chosen were such as to prevent pH changes in the main body of the pack due to the electrolysis.

In both examples the wash solutions used were as follows:

*Eluant.*—3.53 g./l. uramil-N,N-diacetic acid; 6.65 ml./l. dimethylamine (25/30% aq. solution from British Drug Houses Ltd.); pH value 9.5.

*Anolyte.*—0.1 N ammonium hydroxide solution.
*Catholyte.*—0.1 N hydrochloric acid solution.

The mixtures of potassium, sodium and lithium were made up according to the following recipes:

*Example 1*

| | |
|---|---|
| Uramil-N,N-diacetic acid _____ g__ | 0.353 |
| 0.1 N KCl _____ ml__ | 6.67 |
| 0.1 N NaCl _____ ml__ | 6.67 |
| 1 N $Li_2SO_4$ _____ ml__ | 3.34 |
| 2.5 3% aq. dimethylamine _____ ml__ | 6.67 |

Diluted to 100 ml. with deionised water.

*Example 2*

| | |
|---|---|
| Uramil-N,N-diacetic acid _____ g__ | 0.353 |
| 0.1 N KCl _____ ml__ | 6.67 |
| 0.1 N NaCl _____ ml__ | 6.67 |
| 0.1 N $Li_2SO_4$ _____ ml__ | 6.67 |
| 2.5–3% aq. dimethylamine _____ ml__ | 6.67 |

Diluted to 100 ml. with deionised water.

As mentioned above, 75 ml. of each of the above mixtures were used in the respective runs. These feed solutions were placed in a graduated cylinder, and the micropump 29 used to pump them into the pack at a steady rate until the cylinder was dry. The resistance of the pack, and consequently the voltage, fell over the first four or five hours, after which the voltage became substantially constant. Two sets of fractions were collected in each example, comprising the total eluate collected in each of two periods.

Figure 8:
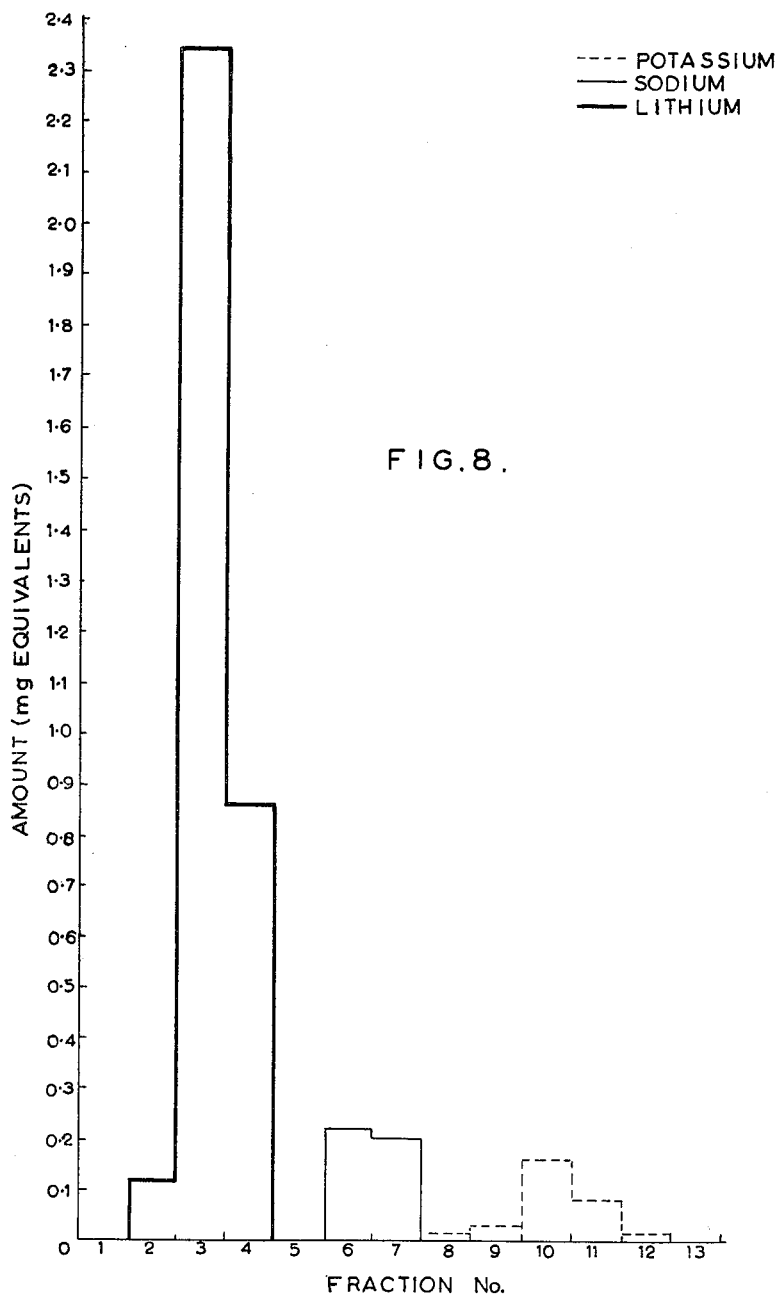

Details of the content of the respective fractions are given in the table below:

FIGURE 10 gives the totals from the addition of the information contained in FIGURES 8 and 9;

FIGURE 11 reveals the alkali metal content of each of the fractions collected after 8 hours in Example 2;

FIGURE 12 gives the same information in respect of the fractions collected after a further 16 hours in Example 2; and FIGURE 13 gives the totals from the addition of the information contained in FIGURES 11 and 12.

It can be seen from the table and the said graphs that the separations are clear-cut and reproducible. It will also be seen that, under the conditions in question, the break-through volume of potassium is far greater than that of lithium. Finally, recovery may be considered complete in all cases. However, even if some irreversible adsorption were to take place, this would not matter, once steady-state conditions were established.

What I claim is:

1. A cell for use in effecting electrochromatographic resolution or relative concentration of at least one of a plurality of solutes which comprises a pack of alternating membranes of ion-exchange material in substantially continuous form and sheets of another anti-convectant material held in face-to-face physical contact, means for introducing a solution containing a plurality of solutes into said pack at a point along an edge thereof to form a chromatographic column, means for introducing an eluant into said pack along the remainder of said edge and for traversing said eluant through said pack, means for applying an electric potential across said pack in a plane parallel to said membranes but transversely to the direction of traverse of said eluant, and means for collecting at least two fractions of the resulting eluate at different points on the opposite edge of said pack.

2. A cell according to claim 1, wherein the sheets of ion-exchange material are ion-exchange membranes.

3. A cell according to claim 2, wherein the ion-exchange membranes are homogeneous membranes of low specific resistance.

4. A cell according to claim 2, wherein the ion-exchange membranes are heterogeneous membranes of low specific resistance.

5. A process for effecting the electrochromatographic resolution or relative concentration of at least one of a plurality of solutes which comprises introducing a solution containing a plurality of solutes into a cell which comprises a pack of alternating membranes of ion-exchange material in substantially continuous form and sheets of another anti-convectant material held in face-to-face physical contact at a point along an edge thereof to form a chromatographic column, introducing an eluant

TABLE

| Example No. | Ion | Recovery (mg. equivalents) | | Total recovery (mg. equivs.) | Nominal input (mg. equivs.) | Fractions [1] containing ion | | Current (ma.) | Starting voltage | Average voltage |
|---|---|---|---|---|---|---|---|---|---|---|
| | | Set 1 fractions (0–16 hours) | Set 2 fractions (17–24 hours) | | | Set 1 | Set 2 | | | |
| 1 | Li | 3 | 0 | 3 | 2.5 | 2,3,4 | _____ | 216 | 390 | 314 |
| | Na | 0.4 | 0.1 | 0.5 | 0.5 | 6,7 | 6,7 | | | |
| | K | 0.3 | 0.3 | 0.6 | 0.5 | 8–12 | 10–12 | | | |
| | | (0–8 hours) | (9–24 hours) | | | | | | | |
| 2 | Li | 0.3 | 0.2 | 0.5 | 0.5 | 3 | 3 | 212 | 375 | 297 |
| | Na | 0.1 | 0.4 | 0.5 | 0.5 | 6,7 | 5,6,7 | | | |
| | K | Trace | 0.6 | 0.6 | 0.5 | 8,9 | 8–12 | | | |

[1] Fractions numbered serially from 1 (anolyte) to 13 (catholyte).
N.B. Feed pumped in steadily from 0 to 13½ hours.

These results are amplified graphically in the block graphs constituting FIGURES 8 to 13 of the accompanying drawings. Of these figures:

FIGURE 8 reveals the alkali-metal content of each of the fractions collected after 16 hours in Example 1;

FIGURE 9 gives the same information in respect of the fractions collected after a further 8 hours in Example 1;

into said cell along the remainder of said edge and traversing it through said cell transversely thereof and whilst employing an electric potential applied across said pack in a plane parallel to said membranes but transversely to the direction of traverse of said eluant and collecting at least two fractions of the resulting eluate at different points on the opposite edge of said cell.

6. A process according to claim 5, wherein the process is carried out continuously by introducing both said solution and said eluant continuously.

7. A process according to claim 5 wherein the eluant contains a complexone.

8. A process according to claim 6, wherein the eluant contains a complexone.

References Cited in the file of this patent

UNITED STATES PATENTS

| | | |
|---|---|---|
| 2,555,487 | Haugaard et al. | June 5, 1951 |
| 2,678,132 | Beard | May 11, 1954 |
| 2,854,394 | Kollsman | Sept. 30, 1958 |
| 2,884,367 | Karler et al. | Apr. 28, 1959 |